United States Patent [19]

Klaus

[11] 3,847,766

[45] Nov. 12, 1974

[54] PROCESSES FOR THE TREATMENT OF CRUDE CALCIUM SULFATE TO RENDER IT SUITABLE FOR CONVERSION TO PLASTER OF PARIS

[75] Inventor: Gerhard Klaus, Bad Grund, Germany

[73] Assignee: Fels-Werke Peine-Salzgitter GmbH, Goslar, Germany

[22] Filed: Apr. 12, 1973

[21] Appl. No.: 350,468

[30] Foreign Application Priority Data
Apr. 20, 1972 Germany............................ 2219223

[52] U.S. Cl............................ 204/157.1 S, 423/555
[51] Int. Cl............................ B01j 1/12, G01f 11/46
[58] Field of Search .............. 204/157.1 S; 106/110; 423/555

[56] References Cited
UNITED STATES PATENTS
2,251,959   8/1941   Smith............................ 204/157.1 S FOREIGN PATENTS OR APPLICATIONS
526,684   6/1931   Germany ............................ 106/110

Primary Examiner—Howard S. Williams
Attorney, Agent, or Firm—Michael S. Striker

[57] ABSTRACT

Processes for treatment of synthetic crude gypsum containing water-soluble phosphates and water-soluble silicofluorides to reduce the amounts of the said water-soluble compounds therein so that the mixture on dehydration produces a plaster that, when mixed with water, sets readily to a hard mass that has adequate tensile strength. The treatment consists of adding calcium hydroxide to the crude gypsum and subjecting the mixture to a treatment with supersonic or mechanical high-frequency oscillations that produce tribochemical effects therein.

3 Claims, No Drawings

PROCESSES FOR THE TREATMENT OF CRUDE CALCIUM SULFATE TO RENDER IT SUITABLE FOR CONVERSION TO PLASTER OF PARIS

BACKGROUND OF THE INVENTION

In accordance with a prior process, synthetic crude gypsum is recrystallized as the α-hemihydrate (anhydrite) under pressure in an autoclave to reduce its contents of water-soluble phosphates and water-soluble silicofluorides. Because of this pressure treatment in an autoclave, the processing costs are very high.

Another known process for the same purpose, namely to convert and crystallize the gypsum as the α-hemihydrate comprises the treatment of the crude gypsum with an aqueous calcium chloride solution or with solutions of acids such as, for example, sulphuric or nitric acids.

The disadvantages of these known processes includes the unusually elaborate treatments that are required for the purification, which consequently involves very high processing costs.

A process for separating the water-soluble phosphates and alkali-metal silicofluorides from synthetic crude gypsum by washing out these substances with a plurality of liquids is also known.

Another prior process involves grinding the synthetic crude gypsum before calcination with acid-neutralizing substances. In order to obtain a substantially complete conversion of the water-soluble phosphates into water-insoluble phosphates in accordance with this treatment, a long period of grinding in a mill is required, which consequently also involves high costs and which thereby limit the usefulness of the process.

BRIEF SUMMARY OF THE INVENTION

It is a principal object of the present invention to provide a process that is simpler and essentially much less costly than known processes. This object is attained in accordance with the process of this invention, by subjecting the synthetic crude gypsum to a tribochemical treatment in the presence of calcium hydroxide to obtain a substantial reduction in the amounts of water-soluble phosphates and water-soluble silicofluorides which are present in the synthetic crude gypsum. The effects produced in the tribochemical treatment are complex and the result of shearing, impacting, and contact or pressure effects, especially cavitation effects, that are produced in the presence of the calcium hydroxide. By means of this treatment, the desired results are obtained with substantially less expenditure of effort and substantially less cost and in a much simpler manner. It has been found that with unusually smaller processing costs, the content of water-soluble residual phosphates can be reduced from 0.48 to 0.02 percent, for example, so that, in comparison with the known processes, the desired improvement in mechanical strength of dehydrated crude gypsum after diluting or mixing with water can be achieved with substantially lower consumption.

By the term tribochemical effect or treatment, as used herein, is to be understood the effects produced by the application of supersonic or mechanical high-frequency oscillations to the substances that are subjected to such treatment. These effects are caused by shearing, impacting and contact or pressure effects that occur during the application of such oscillations as well as to cavitation effects that such supersonic oscillations are capable of producing. Supersonic or mechanical high-frequency oscillations are to be understood to be oscillations in excess of 20,000 cycles per second up to megacycles per second.

DETAILED DESCRIPTION OF THE INVENTION

In accordance with a specific preferred embodiment of the invention, the tribochemical effects that are referred to hereinbefore are produced by continuous operation by means of ultrasonic or mechanical high-frequency producing machines. The process is extremely simple and economic and constitutes an especially efficient method for the desired treatment of the synthetic crude gypsum to produce after dehydration a plaster that has an optimum setting time and mechanical strength after being mixed or diluted with water. In this tribochemical treatment, the water-soluble phosphates and water-soluble silicofluorides are converted to insoluble calcium salts while the original alkaline metal moieties of these compounds, to which their water solubility was due, are converted to sulfates that appear not to have an adverse effect upon the plaster to which the treated gypsum or anhydrite is subsequently converted.

In an actual technical test, the time required for the complete conversion of the water-soluble phosphates and the water-soluble alkali-metal silicofluorides to water-insoluble calcium phosphates and calcium silicofluoride and easily filterable alkali-metal sulfates by use of the tribochemical treatment as disclosed in this application, amounted to about 4 percent of that required to produce a similar conversion of the synthetic crude gypsum by treatment in a mill in accordance with the prior process that was referred to hereinbefore. The energy requirement was also correspondingly smaller.

In a further embodiment of the process of the present invention, the setting time of the plaster that is produced from the crude gypsum that is subjected to tribochemical treatment can be controlled by the amounts of calcium hydroxide that are added to the crude gypsum during the treatment. The following results demonstrate the effects on the setting time that are produced by the addition of the specified amounts of calcium hydroxide to a sample of a synthetic crude gypsum which mixture is subjected to tribochemical treatment in accordance with the process of the present invention and then dehydrated and finally diluted or mixed with water. The specified setting times are the periods from the moment water has been added to the resulting plaster and mixed therewith to the onset of hardening or setting of the pasty mass.

| Amount of calcium hydroxide $Ca(OH)_2$ added, Percent by weight | Setting time, in minutes |
| --- | --- |
| 2.3 | 1.5 |
| 2.6 | 3 |
| 5.0 | 1440 |

The process of the invention is conducted, for example, so that the mixture of synthetic crude gypsum and calcium hydroxide is in the form of a pumpable mixture. This mixture is then placed into a mechanical high-frequency or ultrasonic production machine. In continuous operation, these machines generate the tribochemical effect within the mixture so that the synthetic crude gypsum will be activated and thereby the desired reduction in its contents of water-soluble phosphates and silicofluorides will be achieved.

With the aid of this method can be obtained a very cost-saving and simple effective treatment, which promotes the further dehydration of the gypsum and the mechanical strength of casts made from the resulting plaster. The production of the tribochemical effects with the ultrasonic or mechanical high-frequency production machines is relatively simple and above all the process can be conducted in a continuous manner without, as in the known processes, requiring the use of complicated treatments or other purification processes.

Ultrasonic and mechanical high-frequncy production machines, especially built cyclone brakes, pumps, and stirring apparatus may be installed which produce these supersonic and high-frequency oscillations and thus the desired high shearing, impacting and pressure effect.

Inasmuch as the foregoing description comprises preferred embodiments which were selected solely for purposes of illustration, it is to be understood that the invention is not restricted thereto and that modifications and alternations may be made therein in accordance with the teachings herein, without departing from the invention, whose scope is limited solely by the appended claims.

I claim:

1. A process for the treatment of a synthetic crude gypsum containing water-soluble phosphates and water-soluble silicofluorides to reduce its contents of such water-soluble phosphates and water-soluble silicofluorides before dehydration, which process comprises adding calcium hydroxide to the synthetic crude gypsum and thereafter subjecting the mixture to tribochemical treatment.

2. A process as defined in claim 1 in which the tribochemical treatment is produced in a continuous manner by means of supersonic or mechanical high-frequency oscillations.

3. A process for producing a plaster from a synthetic crude gypsum which contains water-soluble phosphates and water-soluble silicofluorides which comprises adding calcium hydroxide to the said crude gypsum before dehydration subjecting the said mixture of calcium hydroxide and crude gypsum to supersonic or mechanical high-frequency oscillations for a sufficient period to convert the water-soluble phosphates and water-soluble silicofluorides therein to water-insoluble compounds, thereafter dehydrating the thus-treated gypsum and finally mixing this dehydrated gypsum with water.

* * * * *